US008538175B1

(12) United States Patent
Epstein

(10) Patent No.: US 8,538,175 B1
(45) Date of Patent: Sep. 17, 2013

(54) SYSTEM AND METHOD FOR REPRESENTING AND CODING STILL AND MOVING IMAGES

(76) Inventor: Joseph Alan Epstein, Pleasanton, CA (US)

(*) Notice: Subject to any disclaimer, the term of this patent is extended or adjusted under 35 U.S.C. 154(b) by 1000 days.

(21) Appl. No.: 12/486,750

(22) Filed: Jun. 18, 2009

Related U.S. Application Data

(60) Provisional application No. 61/073,764, filed on Jun. 19, 2008.

(51) Int. Cl.
*G06K 9/36* (2006.01)
(52) U.S. Cl.
USPC .......................................................... 382/232
(58) Field of Classification Search
None
See application file for complete search history.

(56) References Cited

U.S. PATENT DOCUMENTS

| | | | |
|---|---|---|---|
| 5,410,643 A | 4/1995 | Yomdin | |
| 5,960,118 A | 9/1999 | Briskin | |
| 6,181,816 B1 | 1/2001 | Adams, Jr. | |
| 6,233,017 B1 | 5/2001 | Chaddha | |
| 6,760,483 B1 | 7/2004 | Elichai | |
| 6,801,210 B2 | 10/2004 | Yomdin | |
| 2002/0048406 A1* | 4/2002 | Hagai et al. | 382/233 |
| 2008/0150946 A1* | 6/2008 | Kuo | 345/442 |
| 2009/0010546 A1* | 1/2009 | Rossato et al. | 382/199 |

OTHER PUBLICATIONS

Tsuji, H.; Sakatani, T.; Yashima, Y.; Kobayashi, N.; , "A nonlinear spatio-temporal diffusion and its application to prefiltering in MPEG-4 video coding," Image Processing. 2002. Proceedings. 2002 International Conference on , vol. 1, no., pp. I-85-I-88 vol. 1, 2002.*

* cited by examiner

Primary Examiner — Nirav G Patel

(57) ABSTRACT

A method of and machine for representing an image or images includes detecting features of the image and representing the areas of one or more images. The method further includes detecting features and representations of the areas are encoded. Furthermore, a method of and machine for decoding and reproducing one or more images encoded based on the features and represented areas of one or more images is provided.

22 Claims, 8 Drawing Sheets

SYSTEM AND METHOD FOR REPRESENTING AND CODING STILL AND MOVING IMAGES

CROSS REFERENCE TO RELATED APPLICATION

This application claims the benefit of provisional patent application Ser. No. 61/073,764, filed Jun. 19, 2008 by the present inventor, the entire content of which is hereby incorporated by reference.

BACKGROUND OF THE INVENTION

1. Field of the Invention

The present invention relates to the field of image and moving video representation, encoding, and/or compressing.

2. Description of the Prior Art

Analysis, processing, compressing, and channel encoding of digital images and motion video play an important role in nearly all disciplines. Raw images—commonly represented on a pixel basis—and videos—commonly represented as a temporal sequence of frames of images—possess a number of limitations which prevent their use in most practical applications, including their unwieldy size, lack of perceptual or semantic representation, and failure to gracefully degrade when information is lost.

The prior art generally seeks to encode images and videos using one of two representations. Functional decomposition representation techniques analyze the raw two-dimensional arrays of data from a discrete mathematical basis, transforming the data into different mathematical domains (such as frequency using a windowed Fourier transform, or wavelets), where quantization processes can be applied to omit or decimate information in a manner which may a priori be thought to preserve some human-recognizable aspects of the image or video. JPEG and MPEG-4 Part 10 (AVC) are examples of this. These methods do not directly analyze the image for semantic information, and in doing so, subject the rendered images or videos to artificial pixelation or blurring under higher compression or loss rates, or at differing image scales, belying the implementations' fundamental lack of information of the perceptually distinct parts of the images or video. Motion video representation techniques of this kind use motion compensation to encode and compress the motion of similar visual content between frames. Motion compensation retains the pixel-based aspect of the underlying still-image representation, providing a series of instructions to move and adapt the contents of previous or future rendered frames into the current one. Pixel-based, rather than semantic-based, techniques lose opportunities for efficiency and operation at differing scales and loss rates by being unable to animate the semantic shapes of the image.

Formal decomposition representation techniques in the prior art attempt to apply heuristics to detect or adapt normally continuous mathematical forms from the underlying raw media, which then are encoded. However, prior art is severely lacking in the ability to do this successfully across a variety of images and compression environments.

Vectorization techniques, such as provided within the Adobe family of products "Illustrator", "Shockwave", and "Flash", as well as standards-based vector representations, including two-dimensional and three-dimensional packages, represent the underlying content through mathematical primitive geometric shapes and shading instructions. The implementations, however, are not methods for producing realistic images or videos from raw sources, and are thus limited to use for artistic, often cartoon-like, shapes and shadings created by hand or from automated "tracing" tools operated with human supervision, tools whose function is to outline, but not realistically represent, raw pixel based subject matter. These methods do not provide general methods for lossy compression of the vectorized information, or for producing reasonably realistic or semantically plausible images or videos under significant scaling or information loss.

A method for formal image representation and processing is described by James H. Elder and Rick M. Goldberg in "Image Editing in the Contour Domain," IEEE (1998), based on edge capturing, together with the "blur scale" and the brightness values. This method extracts an edge representation of the image; this "edge representation" of the prior art requires that image information—specifically, the intensities—of the image must be retained for both sides of the edge as intrinsic properties of the "edge", thus preventing the edge from serving as simply a boundary between semantic regions. This non-semantic approach to edges prevents the prior art from accurately representing the color and texture between the edges, as noted by the prior art itself, which requires a blurring process to remove cartoon-like artifacts. Stated differently, the areas of the image between the edges requires long-range extrapolation of the intensities or colors bound to the line. However, it is not the case in general that long-range extrapolation of local properties of an image around an edge represents the properties of images away from edges. Thus, the prior art fails to adequately represent the image for encoding or compressing in the general case. Therefore, the edge representation does not lend itself to compression or reasonable recovery of semantic information under scaling or loss, as partial omission of edge data, even when edge topology is preserved. The resulting increase in uncertainty of the intensity or color of the image around that edge, and not just uncertainty of the placement of the edge itself, makes adequate loss recovery difficult, if not impossible.

A further method for image representation and processing is described within MPEG-4 Part 19, "Synthesized Texture Streams", based on the concept of representing the image by "characteristic lines", touch-ups known as "patches", and possible encoded residuals. The characteristic lines, as described within the prior art, are lines within the image that have similar "cross-sections", or brightness patterns viewed when taken across or perpendicular to the characteristic lines. The prior art requires that the characteristic lines be tied with this brightness (or similar) information recovered from the cross section. The representation of the image by characteristic lines with line color profiles derived from the cross section suffers from many of the same problems as contour domain analysis, including non-semantic representation and inadequate or incorrect recreation of the color or intensity of an image away from the characteristic lines. The authors of this prior art incorrectly conclude that reasonable image representation is impossible without such brightness information bound to or associated with the characteristic lines. However, binding brightness information to a characteristic line is artificial and limiting, such as in the case of moving video. In a moving video, a characteristic line should be created from the edge of one object as it partially obscures another. When the foremost object moves, the brightness information of the image, and generating subject matter, along the characteristic line on the side of the obscured object would change in ways that would likely have that information in one frame have nothing to do with similar information in another, as various parts of the obscured object come into view. As an example, the shoulder of a person walking in the foreground of the image may be adjacent to, at first, a building, then a tree, then the sky, as the person moves through a scene. The image information of the building, tree, and sky are not related, and so that half of the cross section of the characteristic line would not have any meaningful frame-to-frame correlation, thus preventing efficient compression or even cross-frame line correlation. This is another reason why binding brightness to characteristic lines is inadequate. Furthermore, the characteristic line definition and the processes the prior art depends on to detect such lines, by determining the cross-sectional structure of adjacent ridges or edges, adds both unnecessary and constraining complexity to the process and any implementation thereof, as well as reduces the potential efficiency of the encoding or subsequent compression. Confusion over whether adjacent structures that end up combined into a characteristic line—and yet belong to separate and distinct objects in the subject matter of the image that just happen to be adjacent for that one image or section thereof—also lead to an inability to efficiently represent the motion or separation of the structures, can lead to a "surface tension" effect, where accidental adjacencies become combined into structures not present in the subject matter and appear to the observer as warping or combining of what should be distinct areas of the image. Finally, such combinations suffer from the confusion over scale and distance, as what constitutes adjacency is highly dependent on the subject matter and the scale of the image, and therefore requires human observation or a priori information to be provided to the process that is not typically known or expected in image representation methods.

Recognizing that long-distance extrapolation of characteristic line information does not provide the correct colors for the regions between the lines, the prior art introduces additional techniques to compensate, but which fail to provide an adequate solution. One attempted compensation technique provided lies in the notion of "patches", either as elliptical primitives as described in Part 19, or as a general concept of a compact geometric shape. Patches are an ad hoc scheme to represent texture by using a large amount of simply-behaving geometric primitives, and can clearly be seen to not provide a significant benefit over directly storing the pixel values (or residuals) in all but the most contrived images. For example, if each pixel intensity were chosen from a uniformly distributed random variable, the patch method would require one patch per pixel to represent this information, whereas the amount of actual perceptual information contained in such a shading is minimal, describable simply by the bounds of the uniform distribution. Furthermore, patch representations do not offer a significant semantic representation of the varying colors or shades of an image between edges or distinct divisions. Together, a proper patch representation, as envisioned by the prior art, both stores the image representation inefficiently and fails to capture semantic information about the texture between the edges. This fails to provide a representation that can be used under increasing loss rates, compression rates, or varying scales. For rendering a represented image, the prior art relies on "just so" combinations of weighting factors and techniques as a part of aggregation and recreation. The confusion in the prior art of whether a part of the image should get its brightness from the influence of the lines, the background, or texture lead to reconstruction mechanisms that may have a high degree of uncertainty about whether the recreated image fairly represents the subject matter, leading to inefficiency in both creation, representation, and rendering for images. In these cases, the amount of information remaining in the residual is nearly as significant as the information present in the original image, and so effective compression may be reduced.

These failings extend to U.S. Pat. No. 6,801,210 (Yomdin, issued Oct. 5, 2004) and U.S. Pat. No. 6,760,483 (Yomdin, issued Jul. 6, 2004), which anticipate MPEG-4 Part 19. By combining lines with brightness information, using patches to make up the inaccuracies of the reconstruction, and not directly using the lines to bound regions throughout the reconstruction process, the prior art fails to produce an image that reasonably represents the semantic content of the original image across differing scales, compression levels, and loss rates.

Other methods in the prior art attempt to divide the image into cells of limited size, within which cells analysis occurs. This approach fails to adequately or efficiently represent the longer-scale semantic information present in the image, and thus may reduce compressibility and sacrifice quality on the reconstruction. The prior art also suffers from poor detection and extraction of semantic features of an image, often being subject to confusion over whether a relatively faster change in image information represents a line, edge, ridge, or background texture. The advantages of a general purpose feature detector are not present in the prior art, which place too heavy a dependence of the processes themselves on characteristic lines, ridges, or couplings, with those dependencies necessary for the prior art to function and severely constraining on the art itself.

The present invention overcomes the problems associated with the prior art, as described below.

SUMMARY

In accordance with one embodiment, a methods and system for representing, encoding, and compressing images and moving video by extracting features and intermediate regions from the image.

DETAILED DESCRIPTION

In the description herein, one or more embodiments of the invention are described, with process steps, formulas, and data structures. Furthermore, the description includes examples of the outputs of one or more embodiments. Those skilled in the art would realize, after perusal of this application, that embodiments of the invention might be implemented using a variety of other techniques not specifically described, without undue experimentation or further invention, and that such other techniques would be within the scope and spirit of the invention.

The scope and spirit of the invention is not limited to specific examples mentioned therein, but is intended to include the most general concepts embodied by these and other terms.

Figure 1:
FIG. 1 is the material for the source image used as an example of the output of one embodiment.

FIG. 1 shows the source material digital image used for an example of the output of one or more embodiments. The example image chosen is grayscale, to better elucidate the processes used, and those skilled in the art will clearly see how the same processes described herein apply to color or additional image information.

Figure 2:
FIG. 2 (prior art) is the result of a JPEG representation of the source image, under high amounts of compression (loss)

FIG. 2 (prior art) shows the source image represented using JPEG under high amounts of compression. The blocking effect from JPEG is clearly evident, causing the skin tone of the female figure within the image, as well as the pavement to the figure's left, to be riddled with strong and sharp edges that are not present in the original image. MPEG encoding for a low-bandwidth or high-error channel can produce key frames with higher degrees of decimation than that of this image.

Figure 3:
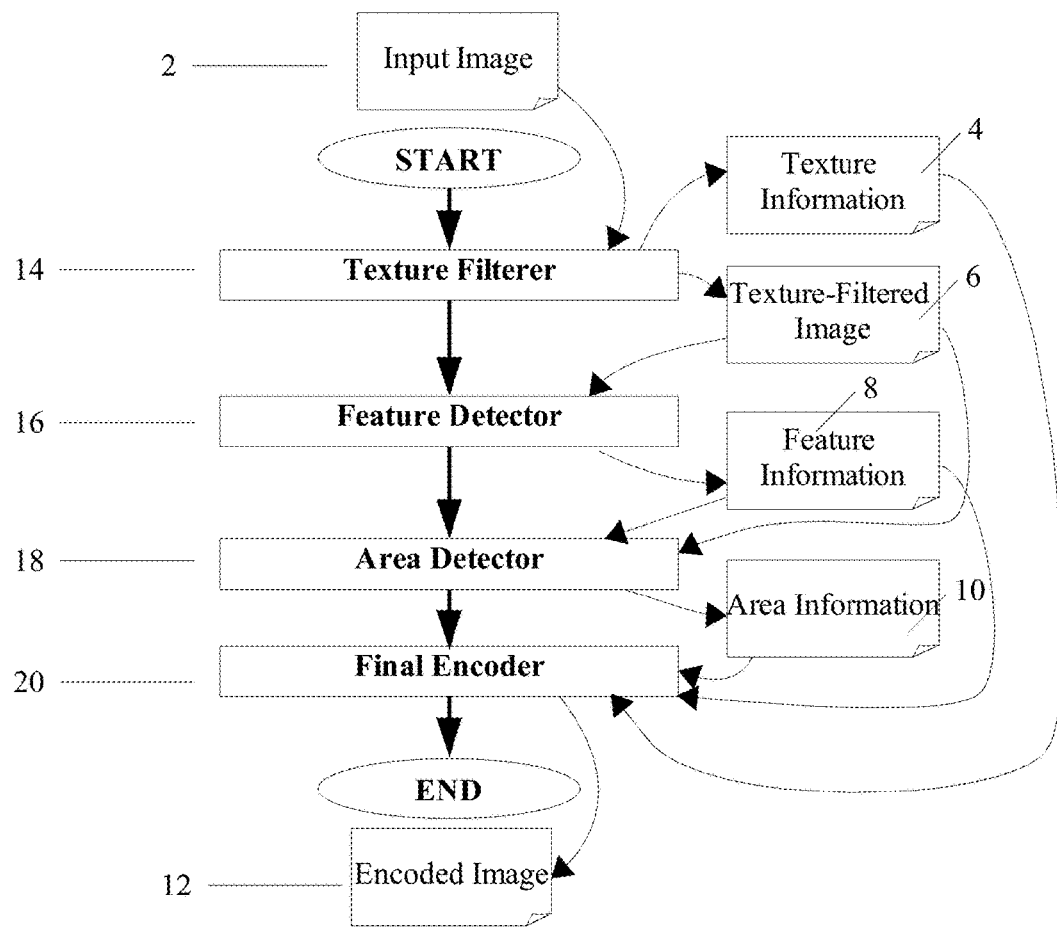
FIG. 3 shows the process for encoding the image for one embodiment.

FIG. 3 depicts an encoding process for one embodiment. An input image 2 is provided to a texture filterer 14. The texture filterer extracts, from the input image, texture information 4 and provides a texture-filtered representation 6 of the original image without some the texture information that was extracted. Applying the texture filter may aid in better extraction of features. One embodiment for this step is to use an anisotropic diffusion filter repeated a number of times N_aniso over the original image, with the results of the anisotropic diffusion filter iteration becoming the texture-filtered image and the signed pixel-wise subtraction of the texture-filtered image from the input image becoming the texture information. One particular implementation of anisotropic diffusion filtering is presented below. Those skilled in the art will recognize that the setting of N_aniso, k, the function getC, and the other details, including the choice of anisotropic diffusion, may be changed without exceeding the scope and spirit of the invention.

```
let k = 5
let I_0(x,y) be the input image to anisotropic diffusion
let I_i(x,y) be the results of the iteration i
for i between 1 and N_aniso
    foreach pixel p in I_(i−1)
        let v = the value of p in the image I_(i−1)
        let dup = p − the value of the pixel above p
        let ddown = p − the value of the pixel below p
        let dleft = p − the value of the pixel left of p
        let dright = p − the value of the pixel right of p
```

-continued

```
        let cup = getC(dup)
        let cdown = getC(ddown)
        let cleft = getC(dleft)
        let cright = getC(dright)
        I_i(x,y of p) = v + 0.25 *  ( dup     * cup
                                    +ddown   * cdown
                                    +dleft   * cleft
                                    +dright  * cright)
    end for
end for
return I_(N_aniso)
function getC(d)
    return 1 / (1 + (d / k)**2)
end function
```

This embodiment may have the effect of blurring out texture from the input image while leaving more of the distinct edges of the figure better intact, with the texture information then holding the residue from the blur. Other methods that may help isolate or subtract texture information, in varying degrees, from the image may be used by those skilled in the art without adding novelty.

Another embodiment is to use lossy extraction and representation techniques for the texture. Another embodiment is to use isotropic diffusion (Gaussian filtering). A texture filterer 14 may perform additional filtering to the image or results, before or after the filtering. A texture filterer may use perceptual or mathematical techniques to direct or aid in the recognition of texture material or the separation of texture from the underlying image. A texture filterer may use a database of known or prototypical textures, to aid in detection or in encoding of the texture. Additionally, pattern matching or detection may be used, and self-learning systems may be employed from the art. Those skilled in the art will readily see that the choice of filtering, and of the parameters used within, do not exceed the scope or spirit of the invention. Furthermore, although the term "texture" is used here, there is no requirement that a filter detect, filter, or represent information that might be recognized as a texture by a person at any step in the process, and it is clear to those skilled in the art that any number of filtering steps, including no filtering and the corresponding absence of texture information, may be performed as an embodiment of a texture filterer.

Figure 4:
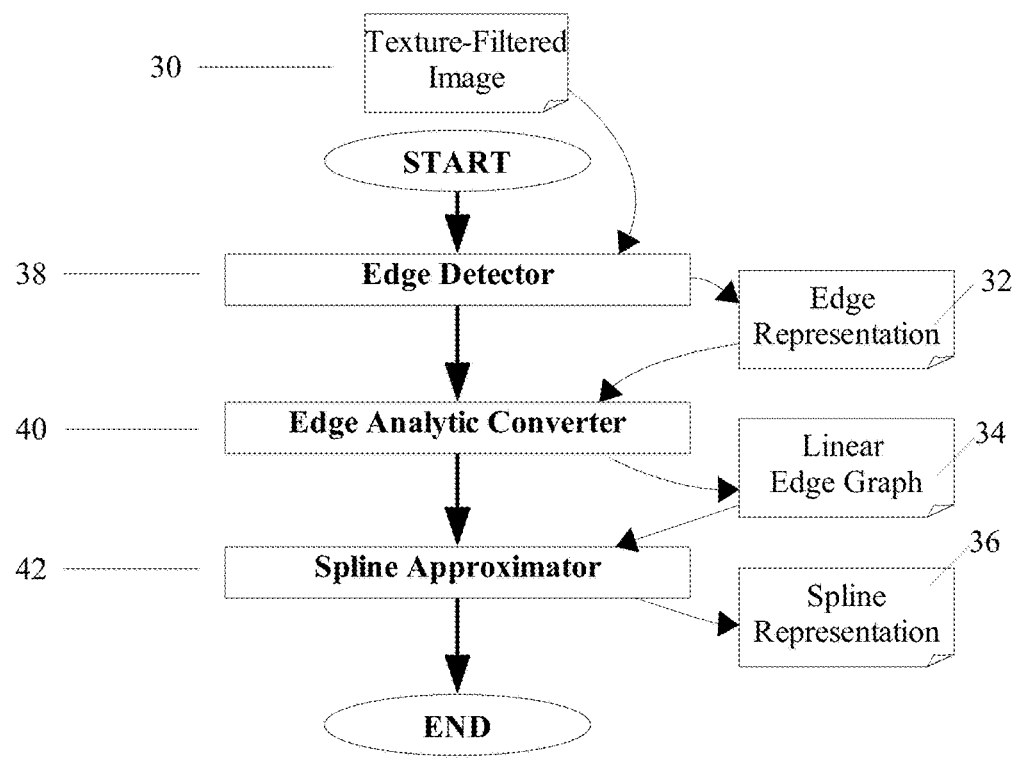
FIG. 4 shows one embodiment for a feature detector.

A feature detector 16 takes a texture-filtered image 6 and produces a representation 8 of some or all of the features of the image. One embodiment of a feature detector is to follow the subprocess mentioned in FIG. 4: an edge detector 38 takes a texture-filtered image 30 (which may be identical to 6, or may be based on 6 but have had additional processing applied, or may be based on any combination of processing on 6 and 2) and produces a representation 32 containing those pixels or interpixel locations that represent a significant edge or feature. One embodiment is to use a discrete differential linear convolution method, such as the differential matrix pair Dx=(0 0 0; 0 −2 2; 0 −2 2) and Dy=(0 0 0; 0 −2 −2; 0 2 2) applied to a texture-filtered image, to produce horizontal and vertical components (Idx, Idy) of one form of a discrete differential at each point in the image. Further clamping of these images Idx, Idy to set to 0 the horizontal and vertical components for each pixel whose differential magnitude sqrt (Idx(x,y)2+Idy(x,y)2) is less than a threshold value T_differential may be performed, which may deemphasize minor changes in the image. Additional processing of the clamped images to set to 0 points that are not maximal in the gradient magnitude along the linear direction of the gradient at that point may be employed, resulting in a different Idx, Idy. Those skilled in the art will recognize that the choice of discrete gradient or differential used (extending to using other well-known methods, such as Sobel filtering), the presence and tuning of the clamping and maximal point detection used, or the addition of further filtering and processing steps that may reduce or refine the inclusion or create associated data for each point does not detract from the spirit and scope of the invention.

An edge analytic converter 40 takes an edge representation and produces a linear edge graph 34 representing some possibly distinct edges of the image. One embodiment of an edge analytic converter is to convert an edge representation (as Idx, Idy) into a graph Gd with edges connecting every point with its neighbor, so long as both points of an edge have non-zero gradient magnitudes, and with the weight of the edge equal to the absolute difference in angle between the gradients of the endpoints of the edge, expressed as degrees in the range [0, 180]. The minimum spanning tree of Gd, called Gdmin, is produced. Gdmin is processed to remove spurs—or branches where each internal node to the branch has degree 2, one external node has degree 1, and the other has degree >2—of length less than T_spur, producing graph Gdmspur. Gdmspur is then processed at all nodes of degree 1, to close any broken loops that the spanning tree step created—one embodiment examines all edges in Gd that each degree 1 node in Gdmspur belongs to and adds the edge with the minimum weight—producing a new graph Gdmloop, the output of the edge analytic converter.

Another embodiment is to use tracing, including threshold and hysteresis-based tracing, to produce an edge graph. Those skilled in the art will readily see that the method of producing the linear graph—including but not limited to not producing a linear graph directly, representing the linear splines in a non-graph method, or producing a non-linear graph initially—may be modified or substituted without exceeding the scope and spirit of the invention.

A spline approximator 42 acts on a linear edge graph to produce a spline representation 36. One embodiment produces piecewise-quadratic approximations of each branch of a linear edge graph (thus following the topology of such linear edge graph), starting in an arbitrary direction from each branch. One implementation maintains an initially trivial list of approximating, connecting quadratics, as well as its place along the branch. For each edge not yet encountered along the branch, that embodiment adds the edge to the segment to be approximated by the quadratic at the end of the list and produces a least-squares quadratic passing through the two ends of the segment approximated by the quadratic piece if, given each angle ma equal to the maximum of the two angle differences in the gradient magnitude of the edge representation for the endpoints of adjacent edges along the branch, the per-node difference in position between the quadratic and the underlying graph branch exceeds T_splineinner if ma>=A_splineinner, T_splineouter if ma<=A_splineouter, or cubically mixed between those points using a standard cube interpolant p(alpha, v1, v2)=(v2−v1)*alpha**2*(3−2*alpha)+v1. Otherwise, a new quadratic is created, starting at the previous point, and the previous quadratic, if it exists, is finished. This continues until the branch is covered. In pseudo code

```
let Gd be the graph, mentioned above, with nodes located at each
    point of the image and with edge weights equal to the absolute
    difference in gradient angles of the endpoints.
let Glin = the linear edge graph
let out = the out graph of approximations, with the same
    topology as Glin, initially empty
for each branch in Glin
    let p1 = the start of the branch
    let p2 = the next point in the branch after p1
    walk_fit(Glin, p1, p2, out)
end for
function perNodeError(Gd, prev, p, next, t, tend, isx)
    return T_splineinner unless defined p and defined prev and
        defined next;
    let prevw = weight of Gd edge (prev, p)
    let nextw = weight of Gd edge (p, next)
    let A1 = prevw
    let A2 = nextw
    let A = max A1, A2
    let r = the to-be-returned error
    if A >=A_splineinner then
        r = T_splineinner
    else if A < A_splineouter then
        r = T_splineouter
    else
        r = mix cubically with
            alpha =(A−A_splineinner)/(A_splineouter −
A_spineinner)
            T_outererror, T_innererror
    return r
end function
function walk_fit(Glin, p1, p2, out)
    let p1 = the first point in the branch
    let p2 = the second point in the branch, adjacent to p1
    let pstart = p1
    let points = array of points along branch from p1, towards
        p2, such that it ends at (and includes) the first point
        not of degree 2
```

```
        let pend = last point in points;
        return if this branch has already been walked either
            direction from (pstart->pend) or (pend->pstart)
        let xdata be the x values of the points in the branch
        let ydata be the y values of the points in the branch
        let xresults = fitData(xdata)
        let yresults = fitData(ydata)
        save xresults and yresults as the approximation for the
            branch in the graph "out"
    end function
    function fitData(data)
        let approx = list of current parabola approximations
        let a,b,c be the three constants of the approximating
parabola
        let t0 = 0
        for each index t along data
            let na, nb, nc = the three constants of the approximating
                parabola na*t**2 + nb*t + nc
            set na, nb, nc = quadraticFit(data from t0 to t)
            if the parabola's absolute error at t exceeds
perNodeError
                record a,b,c as the best parabola to represent up to
t-1
                t0 = t
                try the for loop again without changing t
            else
                include t in the range well approximated by na, nb, nc
            end if
        end for
    end function
    function quadraticFit(data)
        use linear regression to determine the free value a
            in a*x**2 + b*x + c such that the sum-of-squared error
            between the quadratic and the data is minimized and
            the quadratic passes through the first and last data
point
    end function
```

The resultant list of splines becomes a feature representation 8.

Another embodiment is a null implementation, which uses a linear edge graph as the spline representation, where each edge is regarded as a piece of the piecewise linear spline. Another embodiment is to produce a linear spline approximation, by solving the problem of minimizing the number of linear pieces of spline such that the sum-of-squares linear distance of the spline from the linear edge graph is less than a threshold. Another embodiment uses cubic splines. Another embodiment uses linear splines. Another embodiment uses any polynomial spline. Another embodiment uses any analytic or mathematical representation of the splines or an approximation. Another embodiment is to use global optimization to minimize or bound the error between splines and the underlying graph. An embodiment may define the distance measure used in determining error. One embodiment may use the nearest Manhattan distance between any point on the spline and any point in the graph. Another embodiment defines the distance to use Euclidean distance, such as the minimum distance between each node and a spline. Another embodiment defines distance to be Euclidean, but along lines normal to the approximating spline. Another embodiment defines distance to be Euclidean, but along lines whose direction is based on that of the underlying gradient at each point along the graph. Another embodiment uses global optimization procedures known to the art to choose the partitions of the splines, such as starting with one spline piece per edge and merging splines whose merge produces the least error, until some error bound is reached. Those skilled in the art will clearly see that the nature of the approximation of the spline, including the tuning of the error parameters and thresholds, the choice of approximating spline, whether the two dimensions would be considered independently or together (thus requiring that a junction of two pieces of the spline in one dimension serve as a junction in another), the type of distance measure of the error, the order in which splines are created, how error is measured and defined, and the nature of the optimization search method to produce the least or constrained error can be modified or substituted without exceeding the spirit and scope of the invention.

Another embodiment uses the difference between a texture-filtered image and a texture as guidance to detect edges. Another embodiment uses the working parameters of anisotropic diffusion or difference-guided filtering as evidence of the difference itself and derives the gradients Idx, Idy from that. Another embodiment uses, in addition to or instead of edge detection, pattern recognition and feature recognition techniques, many of which are known in the art. One embodiment uses pattern recognition techniques that rely on using edge detection to derive a topology of the features, and then pursue topological invariant matching. Another embodiment matches by searching for transformations (affine or not) of known patterns. Those skilled in the art will readily be able to apply known methods to the feature detector without exceeding the scope and spirit of the invention.

One embodiment of a feature detector 16 may have the effect of producing what might be described as an outline of some of the more distinct edges of the image, which is then approximated by quadratic splines.

Figure 5:
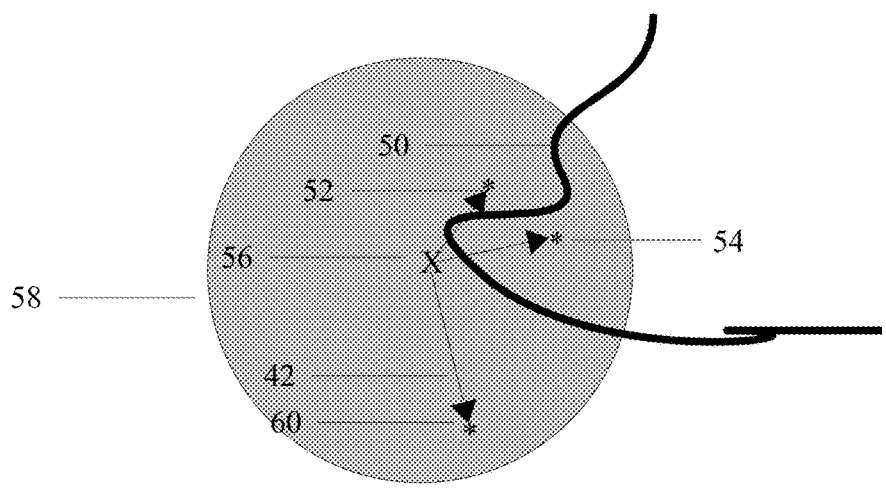
FIG. 5 shows examples of point inclusion used in one embodiment of an area detector.

Returning to the description of an embodiment of an overall encoder, an area detector 18 takes a feature information 8 extracted by a feature detector 16, along with a texture-filtered image 6, and produces an encoding 10 of the areas of an image. One embodiment is to use the feature information of an image as a "mask" or boundary, and to subsample areas within the image, using Gaussian averaging of adjacent pixels to ensure that each sample records the influence of the neighboring pixels, but not using any point in the Gaussian weighted average (and thus having zero weight contribution) if the point lie on the other side of a feature of the sample point. This may be performed using simple ray intersection to ensure that no feature intervenes. FIG. 5 shows one definition of inclusion for this embodiment by way of example. In calculating the value of the Gaussian average at point P of A(P)=SUM[for all included p](w(p)*I(p))/SUM[for all included p](W(p, P)), where W(p, p)=exp(-|P-p|**2/(2*s2)) for standard deviation S, an embodiment includes point p only if it does not lie on the other side of a feature. Point 56 is the center of the average (the P in A(P) above). 50 is a feature. Point 60 is included in the average, because the ray between 56 and 60 crosses no feature. Point 54 is not included, because it is on the other side of a feature from 56. Point 52 is not included, because it is shadowed by—its ray crosses—the feature. In practice, Gaussians are sometimes windowed, often to three times the standard deviation S, and this window is 58**. One embodiment may sample at least the minimum number of points in the texture-filtered image that covers the entire image with the maximum distance between each sample point and either a feature or the midpoint between another sample point limited to the spacing value S_spacing, using the above definition of inclusion. Note that that embodiment of an area detector can be made to be arbitrarily close to lossless by shrinking the value of S.

Another embodiment samples at points such that a utility function taking the representation size and/or the error the resulting encoding would produce (such as the sum-of-squares difference between the encoded image and the sampled image) from the sampled image is minimized. Another embodiment selects sample point locations based on statistical or mathematical properties of the underlying sample image, such as locating samples at points with the highest absolute second derivative or curvature, so long as the entire image is covered in the result. Comparing the decoded results to the sample image as a part of producing the results to determine whether the image is fully covered or is well represented (such as using a sum-of-squares error as a guide to producing the sample points) is another embodiment, whether the comparison is done within the context of producing a multi-scale or hierarchical representation or for just one encoding variant.

Another embodiment is to use two-dimensional (spline or other) approximation for the regions or for the image as a whole—an embodiment may incorporate parts of or derive its approximation from the feature information already acquired. Another embodiment is to use existing lossy image compression techniques, but segmented throughout the image and restricting the inclusion of points in the lossy image compression by the feature information (such as with above). One variant of that embodiment uses the presence and properties of the features to guide the segmentation, blocking, and compression levels of existing lossy image compression techniques. Those skilled in the art will recognize that the above embodiments may be altered (such as including points in the same topological region without regard to being shadowed by a feature, or altering the definition of distance between two points to measure shortest distance not crossing a feature), or the method may be substituted with another without exceeding the scope and spirit of this invention.

A final encoder 20 assembles a texture information 4, a feature information 6, and an area information 8 and produces an encoded image 12. One embodiment performs the following:

a) From a quadratic spline feature detector such as above, each branch is recorded as the pair of one-image-dimensional (parametric) quadratic splines, represented as repetitions of [t(i), p(i), a(i)] along the partition of parameter t, taking on value p and connecting to the next repetition using a as the value of the first coefficient of the quadratic a*t**2+b*t+c, with the constraint that the parabola of a(i) passes through (t(i), p(i)) and (t(i+1), p(i+1)). This is enough information to completely encode the quadratics.

b) The area information is represented as a series of triples [x, y, v], where (x,y) is the position in the image, and v is the value of the averaging at the point (bearing in mind that a color image has a vector as the average)

c) The texture information is encoded as the difference image, quantized by the function Ti(p)=[int(C*log(|I(p)|+1))*sgn(I(p))] along each channel of the image.

d) Finally, the products of a, b, and c are losslessly compressed using bzip2. Another embodiment segments the texture into regions, and uses lossy frequency compression (such as DCT) for each segment, where the segment size and the degree of discarding and quantization after DCT is determined or influenced by the properties of the segment. Another embodiment has block and compression levels guided by the presence and properties of the feature information. Another embodiment segments the texture information specifically into regions based on the feature information, and applies different scale-space-directed encodings to the texture information. Another embodiment analyzes the texture information for statistical and mathematical properties, and produces generators that mimic those properties (such as mean, variance, periodicity in space) or produces parameters for existing generators. Another embodiment uses pattern recognition techniques to chose textures from a database of known textures. Another embodiment is to not produce one encoded image, but to leave the products and by-products separate: trivially, all products and by-products might be encoded somehow (any digital representation, in any form, is an encoding by definition), and other embodiments might not provide any further processing and might keep the information separate or in its raw form.

In addition to or instead of using lossless encoding such as bzip2, the information being encoded may be ranked or ordered in preference to allow for discarding information across a lossy channel or for different compression rates. The representation of features may be ordered, ranked, classified, or understood to prioritize features of greater significance to the image (such as splines whose generating points in the gradient have the highest magnitude) over features of lesser significance (such as lesser magnitude). An embodiment might order an area representation by differences of adjacent samples or the complexity of the topology of the features around the points (sample points away from features and more similar to their neighbors may be discarded, or merged into other samples to reduce the representation size). Texture information may be ordered by an embodiment to prioritize more complex textures or those across greater areas of the image. Additionally, an embodiment might use prioritization or other factors to produce multiscale renditions of the particular information representing the image, at different scales or in different shapes, to facilitate easier compression or loss recovery. Multiscale rendition set may be hierarchically produced by an embodiment, where higher level-of-detail information is made of refinements to information already present in lower level-of-detail information. The use of such multiscale rendition techniques is an additional embodiment. Encoding to the channel or producing scalable levels of compression is an additional embodiment. It is clear to those skilled in the art that the methods employed in these step may be altered or substituted without exceeding the scope and spirit of the invention.

An additional embodiment of the encoding process of the invention is to perform texture filtering and area detection together, possibly dispensing with transmitting an encoding of texture 4 and using an area detector to perform both steps. A variant of such an embodiment is to use an input image, rather than a texture-filtered image, or to provide both, as inputs to an area detector. This may lead to avoiding duplication of information in lower loss or lossless encodings. Keeping the two separate may allow, when texture information is inherently high frequency, whereas the area information is inherently low frequency, for different processing techniques to be applied to each set of information. It is readily apparent to those skilled in the art that implementations may be modified or optimized to use partial results or works in progress from previous steps without exceeding the scope and spirit of the invention.

FIG. 5 shows one embodiment of the decoding process. An initial decoder 80 takes an encoded image 70 such as that which was produced by encoding (referred to as 12), and decodes feature information 72, texture information 74, and area information 76 that might represent the information for an image or images; these may represent some of the information that was represented in, respectively, feature information 8, texture information 4, and area information 10. One embodiment performs the following:

a) the data is decompressed using bunzip2 b) texture information is expanded using $Te(p)=[(exp(|Ti(p)|)-1)*sgn(Ti(p))/C]$ along each channel of the image c) feature information is represented as quadratic splines as with an embodiment of the final encoder 20 d) area information remains represented as with an already described embodiment of the final encoder 20

An additional embodiment of this invention is to possibly skip initial decoding and begin with feature information 72, texture information 74, and area information 76 as inputs to the following steps. An additional embodiment uses error-correction and/or decompression to correct for loss in features 72, texture 74, and area information 76 that may have been incurred by the final encoder 20, or channel conditions or additional processing, resource constraining, filtering, or conversion before the start of decoding or based on the resource utilization or other utility criteria for the decoding step or additional steps in displaying the image.

An area-generator 82 uses area information 76, along with possibly any amount of information (including no amount) of feature information 72, to produce an area-generated image 78. One embodiment of an area generator is to use a weighted Gaussian interpolation of sample points (such as gathered using a process such as described in part in FIG. 5). Using the same or similar definition of point inclusion and exclusion as with an area detector 18 (as shown in FIG. 5), that embodiment of an area generator produces a per-point value and weighting, based on adding in contributions from each sample point, using weightings determined by the Gaussian. Specifically, if $Iv(p)$ is a grid of points representing the numerator of the weighted average being produced (initially 0) and is equal to the Gaussian weighting $W(p, P)$ times $A(P)$, where $A(P)$ is the value of the sample point at P, $Iw(p)$ is the weighting or denominator of the weighted average being produced, then $Ir(p)=[Iv(p)/Iw(p)]$ for each channel of the image is the generated image. $W(p, P)$ may be defined the same as in one embodiment for Gaussian area information, namely $W(p, p)=exp(-|P-p|**2/(2*s**2))$ for standard deviation S. That embodiment may have the effect of possibly filling the image between the some of the features, where many of the edges of the figure may be more distinct and the infill may be smoother.

Another embodiment uses two-dimensional spline interpolation, which may be forced onto a tessellated grid based on the location of the sample points using techniques known in the art. Another embodiment uses neighbor interpolation (linear or non-linear, nearest or beyond) to produce the generated image, using a definition of whether sample points are included in the neighbor based on inclusion rules such as those referenced in FIG. 5. Another embodiment uses interpolation with distances based on the shortest distance between two points in the same region, such that the polyline connecting the two points does not cross a feature. Another embodiment uses a measure function definition to provide the distance used for any interpolation. Another embodiment uses purely analytical procedures, such as supported in Adobe Flash or Illustrator, to display gradients using a combination of splines. Another embodiment uses hardware or software display primitives, such as DirectX or OpenGL, to produce a geometry based on the feature information and the area information, such as a tessellation of triangles with colors determined by vertices; those colors may be determined by the area information and feature information. That embodiment may use features as boundaries, and may produce a polygonal tessellation based on the location of neighboring sample points and the feature information, with the features being approximated by piecewise-linear boundaries or the best approximation to the feature information that the primitives allow. Those skilled in the art will recognize that modifications to the above embodiments may be made, or other methods of shading areas based on known boundaries may be employed without violating the spirit or scope of the invention.

A texture generator 84 takes a area-generated image 78 and texture information 74 and generates texture onto an image, outputting an output image 86. One embodiment of a texture generator is to take decoded texture information, produce an image of texture differences as with an already-described embodiment of a texture filterer 14, and add the two images together. Those skilled in the art will readily see that other methods of texture restoration, generation, or embellishing, based on the particular encoding of the texture from a texture filterer 15 and a final encoder 20, may be substituted without exceeding the scope or spirit of the invention.

Another embodiment of the invention further uses the features to provide the user the ability to interact with a final image, sequence of images, or movies. Another embodiment allows the features and enclosed areas from the features to be altered or distorted, piecemeal or in segments or regions, where areas that were not present in the original image are filled in by the area generator and texture generator. Another embodiment allows for missing features or areas to be inferred using geometric constraints or heuristics. Another embodiment is for the distortion of features to be dictated by a motion encoder, thus producing intermediate frames in an animation sequence or movie—one advantage of this may include producing images with features that remain connected and smoothly contiguous, even for scenes with large jumps of motion. Embodiments may provide multiple or a series of images as inputs and products or by-products through the process. The process may be extended to include the time domain, such as using another dimension. Furthermore, it is not necessary that the inputs to the decoding process come from the outputs of the encoding process, and the results of the encoding process may be used for other purposes. Finally, it is clear that, in the process of detecting texture information, feature information, and area information, that properties of that information may be gathered, and that methods may be used to aid in determining what information is inherently more compressible from a perceptual point of view, and that this determination and subsequent possible coding efforts may be taken individually or within combination of the other information and other processes, as would be expected with techniques that may be suitable for compression. It is clear to those skilled in the art that modifications to the above embodiments, or allowing the by-products or works-in-progress created during decoding may be exposed or used later in decoding or in further steps, does not exceed the scope and spirit of the invention.

Figure 7:
FIG. 7 shows the result of an anisotropic diffusion, repeated 69 times, on the image of FIG. 1

FIG. 7 shows an example of the example input image of FIG. 1 after anisotropic diffusion filtering for 69 iterations, as described in one embodiment of the texture filterer, and thus is an example of the texture-filtered image 6. This image may contain similar or a reasonable subset or correlation with the feature and semantic information of the original image, with possibly recognizable and pleasant clarity, and yet may be missing much of the high-frequency texture information from the original.

Figure 6:
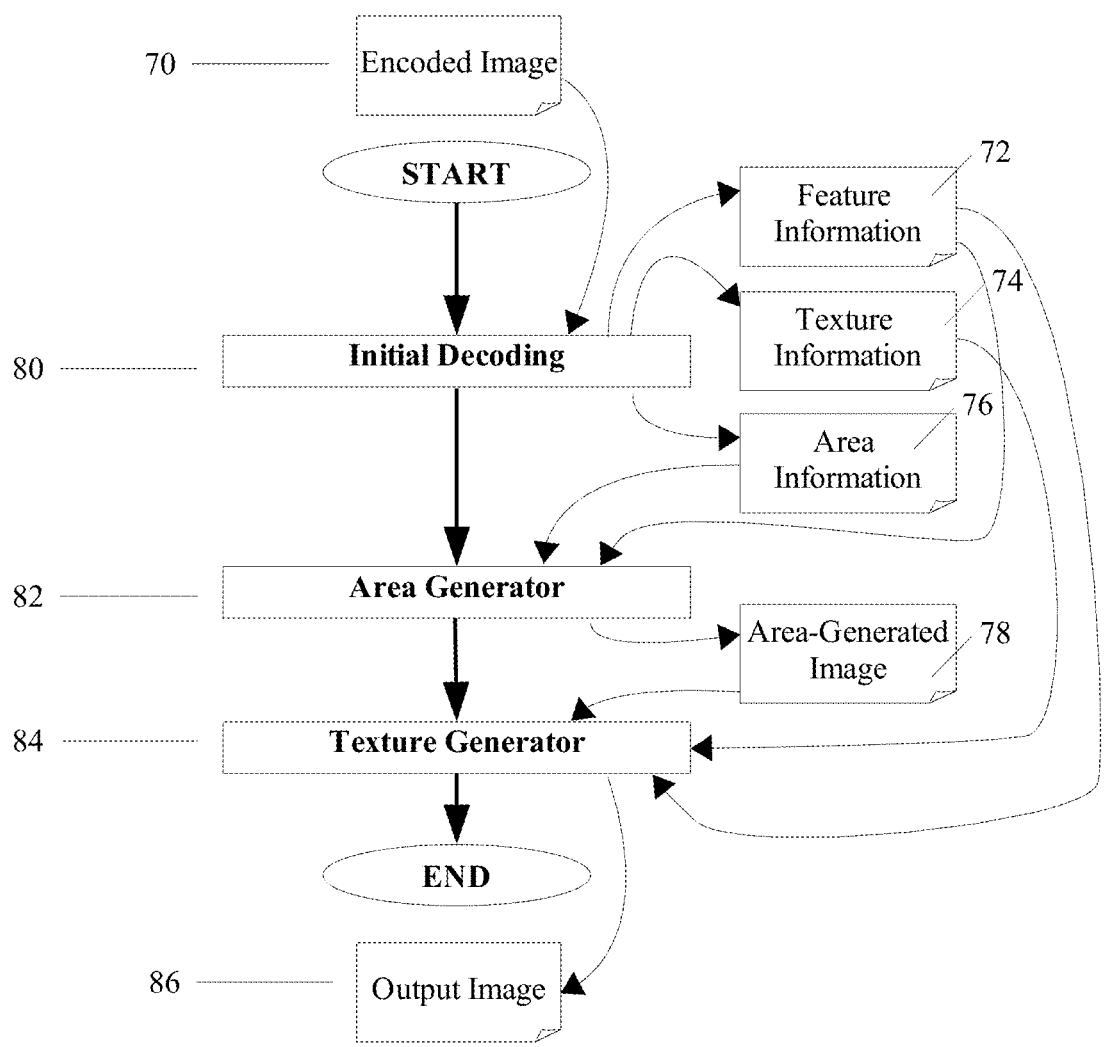
FIG. 6 shows the process for decoding the image for one embodiment
Figure 8:
FIG. 8 shows the difference between the image in FIG. 7 and the image in FIG. 1, with the zero level moved to 128 and clipped to be in [0, 255] at each pixel

FIG. 8 shows an example of the input image of FIG. 1 after the same process in FIG. 6, and is thus an example of the texture 4. The image is shown, processed, as a centered version of the signed difference of the input image and texture-filtered image, with the value 128 added to each pixel to shift the zero-level of the image so that most values are positive.

Figure 9:
FIG. 9 shows a processed image containing the magnitude and direction of the gradient determined from the example as a part of an edge detector mentioned in an embodiment of the feature detector.

FIG. 9 shows the results of the image in FIG. 7 after differential edge detection using the discrete differential linear convolution method mentioned in one embodiment of edge detection. The image is derived from an edge representation 32 by assigning the intensity of the point to be the magnitude of the gradient at each point, and the color of the point to be that at the same degrees around the color wheel as the gradient has. This image was produced after a clipping step, setting to 0 points whose gradient magnitude was less than 15.

Figure 10:
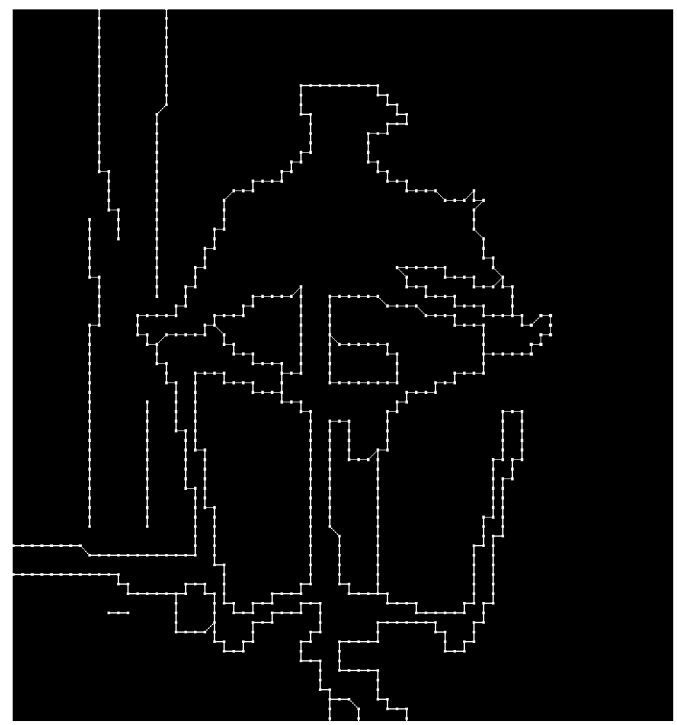
FIG. 10 shows a subset of a rendered graph of the despurred and loop-closed minimum spanning tree established as a linear edge graph 34 for the example.

FIG. 10 shows a subset of a rendition of a linear edge graph 34 derived from the image in FIG. 9. White marks the presence of the edge. The image is a bitmap, sampled from the analytic version of the graph at 8× resolution, with white squares representing the nodes of the graph. The particular subset of the image is of the street lamp in the upper left-hand corner of FIG. 1, attached to the side of the building. This image is produced from Gdmloop of an already-described embodiment, with the despur length T_spur=5.

Figure 11:
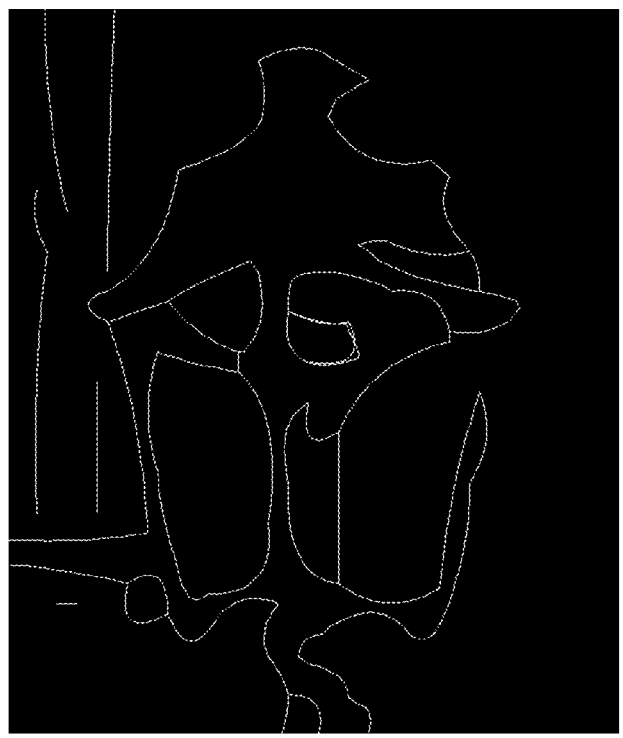
FIG. 11 shows a subset of a rendered quadratic spline approximation—with the splines independently partitioned in the x and y dimensions—of the subject in the example shown in FIG. 10, derived as a part of a spline approximation 36 for the example.

FIG. 11 shows a subset of a rendition of a quadratic spline representation of some features in the subject in FIG. 9, again at 8× resolution, and again of the same lamp as in FIG. 10. This image is produced from a spline representation 36 of one described embodiment applied to the image in FIG. 1, using T_splineouter=0.9 and T_splineinner=0.1, A_splineouter=40 and A_splineinner=180. Different values of the parameters may differently approximate the input edges, or may differently merge quadratics and reduce the overall representation size of the features.

Figure 12:
FIG. 12 shows the entire rendering derived from a spline approximation for the example.

FIG. 12 shows a rendition of the features of the information used to produce FIG. 11, and not just the subset for the lamp.

Figure 13:
FIG. 13 shows a representation of an area-generated image 78 for the example, performed by an embodiment for an area generator 82.

FIG. 13 shows a rendition of the example of an area-generated image 78 using the example and a described embodiment of an area generator 82, using an encoded image 70 equal to an encoded image 12. The value of S was (1+20/sqrt(2))/3 for this example.

Figure 14:
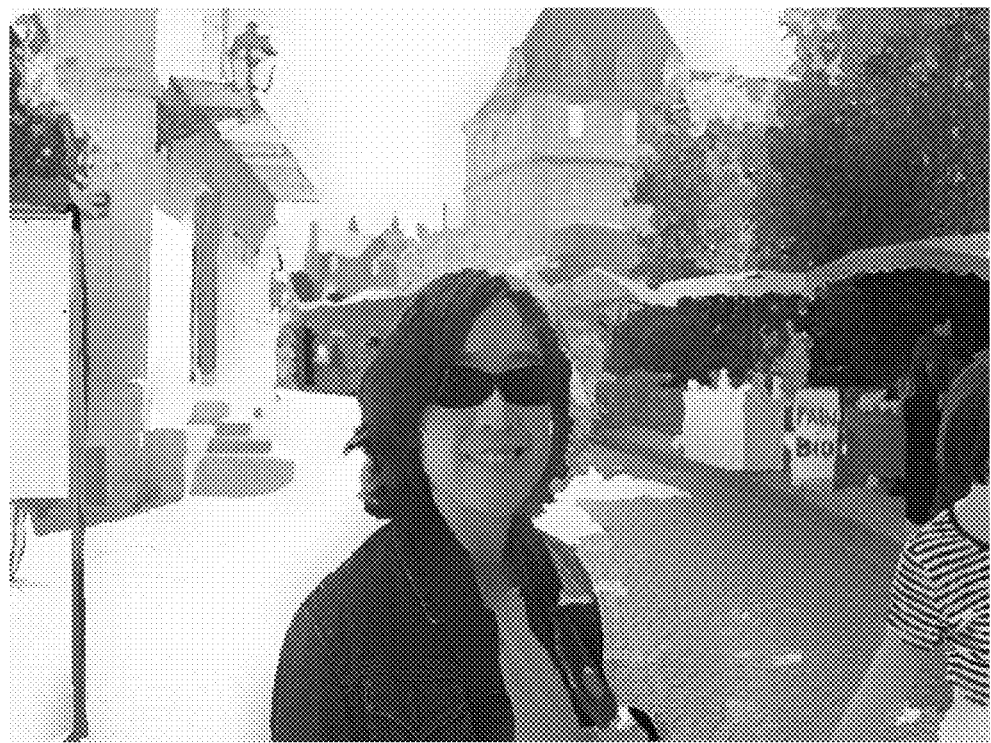
FIG. 14 shows a representation of the decoded image for the example, performed by an embodiment for a texture generator 84.

FIG. 14 shows a rendition of an example of the output image 86 using FIG. 13 as an area-generated image and the decoded version of a texture represented in FIG. 8 (after logarithmic encoding using an embodiment of the final encoder 20 and exponential decoding of an embodiment of the initial decoder 80.

Another embodiment provides a machine for analyzing an image or images. The machine includes a computing device for executing computer readable code, an input device for receiving one or more images (including network or storage input or transfer), at least one data storage device for storing computer data (including a RAM-only system where storage is performed in non-persistent memory), and a programming code reading device that reads computer executable code. The computer executable code causes the machine to detect features of one or more images, and create a representation or approximation of the areas of the image between or around the features. As with the previously described embodiments, the image or images may be filtered for texture information prior to or coincident with the detection of features or representation of areas. Furthermore, the code causes the machine to encode any resulting features detected or areas represented. An embodiment further causes the machine to decode the encoded representations and reproduce said encoded areas based on the decoding. A further embodiment has code that causes the machine to further apply texture to the reproduced areas.

Although the invention has been described with reference to several exemplary embodiments, it is understood that such descriptions and illustrations are not limiting. Changes may be made within the purview of the appended claims, as presently stated, without departing from the scope and spirit of the invention in its aspects. Although the invention has been described with reference to particular means, materials, machines, and embodiments, the invention is not intended to be limited to the particulars disclosed; rather, the invention extends to all functionally equivalent structures, methods, machines, and uses such as are within the scope of the invention and claims.

I claim:

1. A method of analyzing an image or images, comprising:
 a) providing one or more starting images,
 b) detecting features of an image or images identical or related to said starting image or images, and
 c) representing shading of areas of an image or images identical or related to said starting image or images wherein said representing shading of areas comprises: guiding, limiting, constraining, or influencing said representing with said detected features, and
 d) encoding said features and representations of said shading or an approximation thereof,
 whereby the detection of features and representation of shading of the image or images may allow for said image or images to be more efficiently encoding, stored, compressed, displayed at alternate scales or on alternate shapes, or recovered from intentional and unintentional information loss, while substantially retaining semantic or perceptual information about said image or images, and further whereby guiding, limiting, constraining, or influencing said representing shading of areas may reduce or prevent shading information on opposite sides or bounded by a feature from unduly mixing or being influenced by each other or others.

2. The method of claim 1, further comprising: filtering texture information of an image or images identical or related to said starting image or images,
 whereby said filtering of said texture information may improve the operation of said detecting of features, said representing of shading, or said encoding.

3. The method of claim 2 wherein said filtering texture information comprises: one or more applications of anisotropic diffusion.

4. The method of claim 2, further comprising: encoding said texture information along with said features and said representations of shading,
   whereby said texture information may be used to guide or influence the encoding or may be used in a subsequent rendering or decoding, allowing the texture information to substantially be present in the rendering.

5. The method of claim 1 wherein said detecting features comprises: detecting edges of said image or images.

6. The method of claim 5, further comprising: approximating said detected edges.

7. The method of claim 6 wherein said approximating detected edges comprises: approximating said detected edges with splines.

8. The method of claim 1 wherein said representing shading of areas of an image or images comprises: converting, sampling, or approximating of said shading of said areas.

9. The method of claim 1 wherein said encoding of said features and representation of said shading or approximation thereof further comprises: processing said encoding or said features and representation of said shading or approximation thereof for compression, error correction coding, or channel coding, and either or both of altering said encoding based on the results of said processing or creating side information that may be used for further processing, storage, or transmittal.

10. The method of claim 1 further comprising:
   a) decoding said encoding of said features and representations of said shading or an approximation thereof, and
   b) generating reproductions of said areas of said image or images based on said decoding,
   whereby said reproduction of areas may exhibit some of the semantic information contained within first said image or images, and furthermore, whereby said reproductions of areas may be influenced, guided, bounded, or limited by said decoding of said features.

11. The method of claim 10 further comprising: generating textures and applying said textures to said reproduction of said areas,
   whereby said texture information may increase the quality of said reproduction of areas.

12. A machine for analyzing an image or images, comprising: a) a computing device for executing computer readable code; an input device for receiving the digital image and interfacing with a user, said input device being in communication with said computing device; b) at least one non-transitory data storage device for storing computer data, said data storage device being in communication with said computing device; c) and a programming code reading device that reads executable code, said programming code reading device being in communication with said computing device; wherein the executable code causes the computing device to: 1) access one or more starting images, 2) detect features of an image or images identical or related to said starting image or images, and 3) represent shading of areas of an image or images identical or related to said starting image or images wherein said representing of shading of areas comprises: guiding, limiting, constraining, or influencing said representing with said detected features, and 4) encode said features and representations of said shading or an approximation thereof, whereby the detection of features and representation of shading of the image or images may allow for said image or images to be more efficiently encoding, stored, compressed, displayed at alternate scales or on alternate shapes, or recovered from intentional and unintentional information loss, while substantially retaining semantic or perceptual information about said image or images and further whereby guiding, limiting, constraining, or influencing said representing shading of areas may reduce or prevent shading information on opposite sides or bounded by a feature from unduly mixing or being influenced by each other or others.

13. The machine of claim 12, wherein the executable code further causes the machine to: filter texture information of an image or images identical or related to said starting image or images,
   whereby said filtering of said texture information may improve the operation of the machine detecting said features, representing said shading, or performing said encoding.

14. The machine of claim 13, wherein said executable code causes the machine to detect features through means comprising: one or more applications of anisotropic diffusion.

15. The machine of claim 13, wherein the executable code further causes the machine to: encode said texture information along with said features and said representations of shading,
   whereby said texture information may be used to guide or influence the encoding or may be used in subsequent rendering and decoding to allow the texture information to not be lost.

16. The machine of claim 12 wherein said executable code causes the machine to detect features through means comprising: detecting edges of said image or images.

17. The machine of claim 16 wherein said executable code further causes the machine to: approximate said detected edges.

18. The machine of claim 17 wherein said executable code causes the machine to: approximate said detected edges with splines.

19. The machine of claim 12 wherein said executable code causes the machine to represent shading of areas of an image or images through means comprising: converting, sampling, or approximating of said shading of said areas.

20. The machine of claim 12 wherein said executable code causes the machine to encode said features and representation of said shading or approximation thereof through means comprising: processing said encoding or said features and representation of said shading or approximation thereof for compression, error correction coding, or channel coding, and either or both of altering said encoding based on the results of said processing or creating side information that may be used for further processing, storage, or transmittal.

21. The machine of claim 12 wherein said executable code further causes the machine to:
   a) decode said encoding of said features and representations of said shading or an approximation thereof, and
   b) generate reproductions of said areas of said image or images based on said decoding,
   whereby said reproduction of areas may exhibit some of the semantic information contained within first said image or images, and furthermore, whereby said reproductions of areas may be influenced, guided, bounded, or limited by said decoding of said features.

22. The machine of claim 21 wherein said executable code further causes the machine to: generate textures and apply said textures to said reproduction of said areas,
   whereby said texture information may increase the quality of said reproduction of areas.

* * * * *